Oct. 13, 1959 K. G. McKAY 2,908,871

NEGATIVE RESISTANCE SEMICONDUCTIVE APPARATUS

Filed Oct. 26, 1954

INVENTOR
K. G. McKAY
BY
Arthur J. Torsiglieri
ATTORNEY

United States Patent Office 2,908,871

Patented Oct. 13, 1959

2,908,871

NEGATIVE RESISTANCE SEMICONDUCTIVE APPARATUS

Kenneth G. McKay, Summit, N.J., assignor to Bell Telephone Laboratories, Incorporated, New York, N.Y., a corporation of New York Application October 26, 1954, Serial No. 464,737

2 Claims. (Cl. 331—108)

This invention relates to circuit arrangements which utilize semiconductive devices operated to act as negative resistances.

Various arrangements have been suggested hitherto for operation of semiconductive devices as negative resistances. For obvious reasons, such as circuit simplicity, it is preferable to utilize in such arrangements two-terminal or diode semiconductive devices. There have been suggested hitherto arrangements which operate a semiconductive diode to provide negative resistance to alternating signals, but such arrangements have generally involved specific relationships between the frequency of the alternating signal to which negative resistance is exhibited and transit time characteristics of the flow of charge carriers in the semiconductive bodies. As a result, such arrangements are generally limited to operation over a relatively narrow frequency band and so are of limited applicability.

It is a general object of the invention to achieve a negative resistance effect in semiconductive diodes which is relatively independent of frequency.

It is a more specific object to provide a new form of two terminal oscillator capable of operation over a wide band of frequencies.

The present invention utilizes the discovery that the lowest voltage necessary to maintain an avalanche breakdown in a suitably designed semiconductive body can be less than the voltage needed for the breakdown. As a result, a portion of the voltage-current characteristic of such a body exhibits a negative resistance effect which can be used either in a generator of oscillations or in an amplifier.

A feature of the present invention is a semiconductive monocrystalline body which comprises a region which is "substantially intrinsic" positioned intermediate between two heavily doped terminal regions of opposite conductivity type. Such a body can conveniently be described as a PIN or NIP structure. In operation, by terminal connections the intrinsic region is biased to a field strength beyond that characteristic of avalanche breakdown whereby a negative resistance is seen across the terminal connections. The term "substantially intrinsic" as used herein will be defined in more detail below.

In an illustrative embodiment of the invention, an appropriately designed PIN diode is connected serially with a resistive load and a D.-C. voltage source which biases the structure to a point where it operates as a negative resistance, and a capacitance is connected in shunt across the diode to form a relaxation oscillator.

The invention will be described more fully in connection with the accompanying drawings in which.

Before describing more specifically embodiments of the invention, it will be helpful to discuss briefly the principles relevant to avalanche breakdown of the kind characteristic of the operation of such embodiments. A detailed discussion of such principles is set forth in my article in the Physical Review, volume 94, pages 879 through 884, May 15, 1954, entitled "Avalanche Breakdown in Silicon."

In a strict sense, avalanche breakdown defines a discontinuity in behavior and it requires some form of positive feedback which, at breakdown, may result in instability. For avalanche breakdown, the field distribution is made such as to permit multiplication in the body as a result of collisions with injected carriers, i.e., an injected electron collides with a valence electron to produce an electron-hole pair which in turn produce electron-hole pairs in a cumulative process. Its existence depends on the fact that both holes and electron can ionize, thus providing what is essentially positive feedback.

Figure 1:
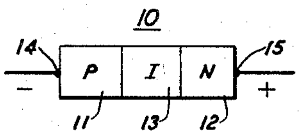
Fig. 1 shows an NIP semiconductive unit of the kind which is utilized to achieve negative resistance in accordance with the invention.

In Fig. 1 there is shown a semiconductive body 10, preferably of silicon, which comprises terminal zones 11 and 12 of p- and n-type conductivity, respectively, and an intermediate zone 13 which is substantially intrinsic. For purposes of exposition, the wafer is not shown to scale, since the intermediate zone is generally much narrower than the terminal zones. Ohmic connections 14 and 15 are made to the terminal zones 11 and 12 by means of which a voltage may be applied to the body, of the polarity shown, to bias in the reverse direction the two barriers formed by the intrinsic zone with the terminal zones.

Figure 2:
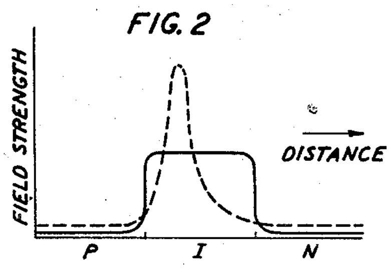
Fig. 2 is a plot showing the electric field distribution in the unit shown in Fig. 1 both before and after avalanche breakdown.

Just prior to breakdown the field distribution across the body advantageously should be as represented by the solid line in Fig. 2 where the field strength is plotted against distance along the body. As shown, the field is substantially zero in the two terminal zones and substantially uniform throughout the intermediate zone. Since it is important that the field strength be sufficiently high for ionization over as wide a portion of the intermediate zone as possible, it is important to concentrate the field in the intermediate zone and to have it substantially uniform throughout this zone. In practice, this is achieved both by having the terminal zones heavily doped so that the voltage drop associated with the body is confined primarily to the intermediate zone and having this intermediate zone "substantially intrinsic" throughout its length. This is in contradistinction to the case of a reversed biased P–N junction in which the field strength across the depletion region corresponding to the space charge layer has a sharply tapering characteristic and becomes too low for multiplication at one end. The width of the intrinsic zone will determine the voltage which must be applied to achieve the desired field strength therein to cause a breakdown. In particular, in silicon, a voltage in excess of ten volts is calculated to be necessary for breakdown at room temperatures of a uniform intrinsic region of a thousand Angstroms width, and a voltage of several hundred volts for widths of about .01 millimeter. In practice, voltages somewhat less than these will ordinary be sufficient since inhomogeneities in the intrinsic region, which result in a field distribution which is not completely uniform, will usually be inevitable.

The term "substantially intrinsic" as used herein in characterizing a region of a semiconductive body denotes a sufficiently low concentration of uncompensated significant impurity elements there as to result across the region in a variation of not more than 25 percent in the electric field strength thereacross under the influence of an applied electric field of strength not quite enough to result in avalanche breakdown. The permissible concentration will to some extent be related to the width of such region but a concentration of the order of $10^{14}$ is characteristic of a width slightly less than .01 millimeter for a region in a silicon body for use with applied voltages of about a hundred volts.

After breakdown, the field distribution advantageously is of the form represented by the broken line in the plot of Fig. 2. As shown, the field distribution is peaked at a point in the intrinsic region which corresponds to the point where the breakdown is localized. However, there is a reduction in field strength along other portions of this region, reflecting ionization there and consequent carrier multiplication. It will also be characteristic that the area under the broken line which is a measure of the extinction voltage will be less than that under the solid line which is a measure of the applied voltage.

Figure 3:
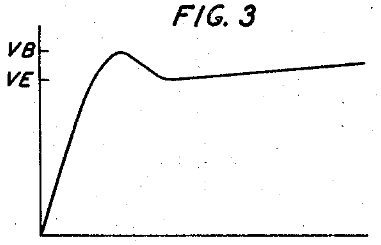
Fig. 3 is a plot of the voltage-current characteristic of the unit shown in Fig. 1.

Fig. 3 represents a plot of the voltage-current characteristic of a structure of the kind shown in Fig. 1. It is to be noted that the portion of the characteristic extending between the applied voltage $V_B$ and the extinction voltage $V_E$ corresponds to a negative resistance, i.e., increasing current with decreasing voltage.

Figure 4:
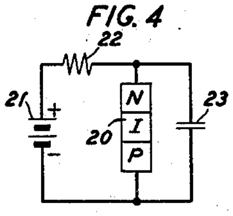
Figs. 4 and 5 show an oscillator and amplifier respectively, which utilize a unit of the kind shown in Fig. 1 in accordance with the invention.

Fig. 4 shows a relaxation oscillator in accordance with the invention. It comprises a PIN semiconductive diode 20 of the kind described having electrode ohmic connections to the terminal zones by means of which diode 20 is connected in series with a D.C. voltage source 21 and a load resistance 22. A reactive element in the form of capacitance 23 is connected in shunt across diode 20. The polarity of the source 21 is such as to result in a reverse bias of the junctions in diode 21 and the magnitude V of the source is sufficient to provide the field strength in the intrinsic zone necessary for breakdown. The value R of the resistance 22 is chosen so that the external resistance seen by the diode matches the net negative resistance provided by the diode. The value C of the capacitance 23 is chosen in accordance with the frequency of operation desired. To a first approximation, the frequency of the oscillations will be given by:

$$\frac{1}{RC \log_e \frac{V-V_E}{V-V_B}}$$

The highest frequency attainable will be limited by the capacity of the diode itself and the frequency characteristic of the discharge. However, the transit times of holes and electrons across the intrinsic zone of the diode are so short as to make possible very high frequency oscillations.

Figure 5:
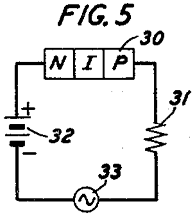

It is, of course, feasible to employ the negative resistance diode for other applications. In Fig. 5 there is shown an amplifier comprising a semiconductive diode 30 of the kind shown in Fig. 1 connected serially with a load resistance 31, a D.-C. voltage source 32, and a signal source 33. The voltage source 32 is chosen to bias the diode 30 in its negative resistance region, whereby amplification is achieved. The degree of amplification is related to the magnitude of the negative resistance relative to the resistances of the external circuit.

Various techniques known hitherto may be employed for forming a PIN structure. When single crystal semiconductive material of sufficient purity to be substantially intrinsic at room temperatures is available, the desired structure may be formed simply by diffusing donors and acceptors in from opposite ends to form the heavily doped terminal zones. Alternatively, a substantially intrinsic intermediate zone may be formed in a semiconductive body by compensating the significant impurity atoms of one type originally there with an approximately equal number of significant impurity atoms of the opposite type. For example, in a semiconductive wafer which initially includes a P–N junction, rapidly diffusing acceptor atoms may be diffused in from the P zone to compensate for the donors in that portion of the N zone adjacent the junction for forming an intermediate compensated zone of substantially intrinsic conductivity.

However, techniques of these kinds do not ordinarily produce a structure in which the barriers between the intrinsic region and the p- and n-type zones are as sharp as desired and in which the number of uncompensated impurity elements is sufficiently uniform over the intrinsic region for fullest realization of the negative resistance effect.

Advantageously, a structure of the kind desired may be fabricated by the technique described below, although the principles of the invention are not dependent on the use of a structure formed by such technique.

Figure 6:
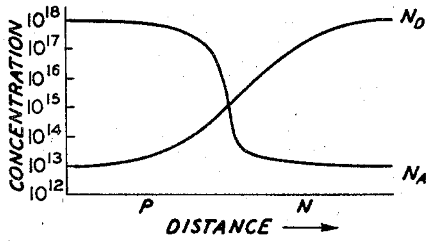
Figs. 6, 7, 8 and 9 are plots of the distribution of the donors and acceptors in a semiconductive wafer at various stages during the process of formation of an NIP unit.
Figure 7:
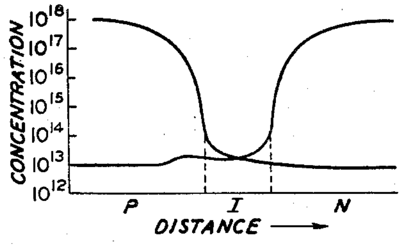

In accordance with a preferred form of this technique a P–N junction is formed in a silicon wafer by the usual methods to have a distribution along the wafer of donors $N_D$ and acceptors $N_A$ as shown in Fig. 6. Advantageously, one of the two impurity elements is chosen to have a mobility in silicon much higher than the other at some moderately elevated temperature, for example 125° C. For example, boron which has low mobility at this temperature may be used as the acceptor element, and lithium which has a relatively high mobility at this temperature may be used as the donor element. This will result initially at the region of the junction in a concentration distribution which is steeper for the acceptor elements than for the donor elements if such elements are introduced by diffusion techniques. The temperature is first raised to 125° C., and then a voltage is applied, by suitable connections to opposite ends of the wafer, for biasing the P–N junction in the wafer in a reverse direction. As a consequence of this applied voltage an electric field is established along the wafer which is concentrated largely in the region of the junction. The direction of this field is such as to cause the mobile lithium ions to diffuse towards the p-type zone, the boron ions remaining relatively immobile. The higher electric field in the region of the junction results in a higher mobility to the lithium ions concentrated there; and, accordingly, such lithium ions are swept into the p-type zone faster than they can be replaced by lithium ions migrating from the main region of the n-type zone of lower electric field. This will result in time in a redistribution of the donor and acceptor elements along the wafer of the kind shown in Fig. 7. As there depicted, there is formed a substantially intrinsic region corresponding to that region, adjacent the junction, of removal of the lithium ions. Moreover, the migration of the lithium ions into that portion of the p-type zone immediately adjacent the junction where the boron ion concentration has a tapered characteristic has a compensating effect on the boron ions there and results to some extent in further steepening of the characteristic of donor predominance at the barrier between the newly formed intrinsic region and the p-type zone. The effect of this migration is depicted in Fig. 7 as a slight increase in the donor concentration in the region of the p-type zone adjacent the barrier with the substantially intrinsic region. Lithium ions diffusing into the main region of boron ion predominance beyond this transition region will there be in such a minority as to have little effect. The final configuration is a distribution of donor and acceptor elements which provides an NIP unit of the kind necessary to the principles of the main aspect of the invention. The width of the substantially intrinsic region can be controlled by the length of time during which lithium ions are removed from the edge of the barrier between the n-type zone and the newly forming intrinsic region.

After an intrinsic region of sufficient width has been formed, the temperature is lowered to room temperature and the applied voltage is then removed. It is important that in operation thereafter temperatures be avoided which result in a degradation by thermal diffusion of the barriers formed.

Figure 8:
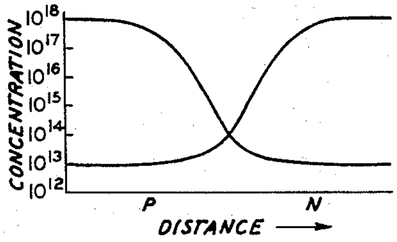
Figure 9:
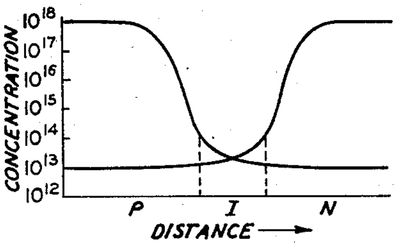

A substantially similar result may be achieved in a modified fashion. In this case, too, a P–N junction is first formed in a semiconductive wafer by conventional methods to have a distribution of donors and acceptors as shown in Fig. 6. In this instance, however, it is feasible to employ donors and acceptors which have about the same mobility at the temperature to be used for diffusion. After the junction is formed, the temperature of the wafer is raised to a point where both the donors and acceptors have an appreciable mobility, but where the material is still somewhat extrinsic. The junction is now biased in the forward direction by a voltage applied to suitable electrode connections at opposite ends of the wafer. Such a bias makes the donors diffuse away from the junction deeper into the n-type zone and the acceptors diffuse away from the junction deeper into the p-type zone. Thus, if the electric field along the wafer were uniform, the distribution of donors and acceptors after a time would be of the form shown in Fig. 8. This would result in a substantially intrinsic region only at the center of the junction. However, since the electric field is actually higher at the junction because of the depletion of carriers in the space charge region, the donors and acceptors will be preferentially swept out of this central region. This results in a further steepening of the barriers between the intrinsic region and the n- and p-type zones with a widening of the effectively intrinsic zone so that the final distribution will be of the form shown in Fig. 9. This again represents the distribution of an NIP structure of the kind desired for use in the invention.

It is to be understood that the various embodiments described are merely illustrative of the general principles of the invention. Various modifications will appear to a worker skilled in the art without departing from the spirit and scope of the invention. For example, although the technique for forming an NIP structure has been described with specific reference to silicon, germanium, silicon germanium alloys and other semiconductors may be used. Similarly, other circuit arrangements can be devised to utilize the negative resistance provided by such structures.

What is claimed is:

1. In combination, a semiconductive body having two end zones of opposite conductivity type and intermediate therebetween a substantially intrinsic layer, a separate electrode connection to each of the two end zones, means defining a first circuit path between the two electrode connections including reactance means resonant with the semiconductive body at a desired frequency, and means defining a second circuit path between the two electrode connections including a load and voltage supply means for establishing in said substantially intrinsic layer a substantially uniform electric field of sufficient magnitude for achieving carrier multiplication in said layer whereby a negative resistance is developed across the two electrode connections.

2. In combination, a two-terminal arrangement for developing a negative resistance across its two terminals comprising a semiconductive body consisting of first and second terminal zones of opposite conductivity type and intermediate therebetween a substantially intrinsic zone, and separate electrode connections to the two terminal zones, the intermediate zone being free of any electrode connections, and means defining a circuit path between the two electrode connections including voltage supply means for establishing in the intrinsic zone a substantially uniform electric field of magnitude for achieving carrier multiplication in said intrinsic zone; and means connected across the two terminals for utilizing the negative resistance developed.

References Cited in the file of this patent

UNITED STATES PATENTS

| | | |
|---|---|---|
| 2,402,662 | Ohl | June 25, 1946 |
| 2,623,105 | Shockley et al. | Dec. 23, 1952 |
| 2,670,441 | McKay | Feb. 23, 1954 |
| 2,711,379 | Rothstein | June 21, 1955 |
| 2,790,037 | Shockley | Apr. 23, 1957 |
| 2,794,863 | Van Roosbroeck | June 4, 1957 |

OTHER REFERENCES

"Electrons and Holes in Semiconductors," by Shockley; D. Van Nostrand Co., Inc., New York, N.Y., 1950.